US010079718B1

(12) United States Patent
Matthews (10) Patent No.: US 10,079,718 B1
(45) Date of Patent: Sep. 18, 2018

(54) NETWORK TRAFFIC PROCESSING SYSTEM

(71) Applicant: Amazon Technologies, Inc., Seattle, WA (US)

(72) Inventor: Nicholas Channing Matthews, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 15/068,211

(22) Filed: Mar. 11, 2016

(51) Int. Cl.
*H04L 12/24* (2006.01)
*H04L 12/26* (2006.01)
*H04L 12/803* (2013.01)

(52) U.S. Cl.
CPC ...... *H04L 41/0816* (2013.01); *H04L 41/0859* (2013.01); *H04L 41/0893* (2013.01); *H04L 43/10* (2013.01); *H04L 47/125* (2013.01)

(58) Field of Classification Search
None
See application file for complete search history.

(56) References Cited

U.S. PATENT DOCUMENTS

| 4,974,256 | A  | * | 11/1990 | Cyr ...................... H04M 3/365 379/112.04 |
| 6,567,377 | B1 | * | 5/2003  | Vepa ..................... H04L 29/06 370/230 |
| 8,127,347 | B2 |   | 2/2012  | Xiao |
| 8,612,744 | B2 |   | 12/2013 | Shieh |
| 8,904,511 | B1 |   | 12/2014 | O'Neill et al. |
| 8,949,410 | B2 |   | 2/2015  | Patel et al. |
| 8,953,599 | B1 |   | 2/2015  | Barth et al. |
| 2014/0317293 | A1 | * | 10/2014 | Shatzkamer ............ G06F 9/455 709/226 |
| 2014/0341029 | A1 | * | 11/2014 | Allan .................... H04L 47/125 370/235 |
| 2015/0082308 | A1 | * | 3/2015  | Kiess ................... G06F 9/5072 718/1 |
| 2015/0092551 | A1 | * | 4/2015  | Moisand ............. H04L 12/4633 370/235 |
| 2016/0234077 | A1 | * | 8/2016  | Rottenstreich .......... H04L 47/12 |

FOREIGN PATENT DOCUMENTS

| EP | 0926859 | 6/1999 |
| WO | 2009120377 | 10/2009 |

* cited by examiner

*Primary Examiner* — Ayaz R Sheikh
*Assistant Examiner* — Tarell A Hampton
(74) *Attorney, Agent, or Firm* — Robert C. Kowert; Meyertons, Hood, Kivlin, Kowert & Goetzel, P.C.

(57) ABSTRACT

A network traffic processing device (NTPD) implements a plurality of virtual network traffic processing devices (VNTPDs), a control plane, and an NTPD manager. The plurality of VNTPDs are configured to perform respective versions of a network processing function on network transmissions, where at least two of the respective versions are different. The control plane is configured to select, for a network transmission based on a management policy, one or more of the VNTPDs to perform respective versions of the network processing function. The NTPD manager is configured to monitor results of the selected VNTPDs performing the respective versions of the network processing function and, based on the monitored results, to determine a configuration change for one or more of the VNTPDs or to control output of the network transmission.

20 Claims, 8 Drawing Sheets

NETWORK TRAFFIC PROCESSING SYSTEM

BACKGROUND

A network may include two or more data centers, each data center may house hundreds or thousands of host devices (e.g., web servers, application servers, data servers, etc.) on a local network. Each data center network may include various network equipment (e.g., servers, switches, routers, load balancers, gateways, etc.) configured to send outgoing data from the host devices onto external networks to be routed to various destinations, and to receive incoming data from sources and route the data to various destination host devices on the data center network. Each data center network may implement a private address space according to a network protocol for routing data to endpoints on the local network. Border devices of a data center network may translate outgoing data packets from the private address space of the data center network to a network protocol used for routing packets on the external network, and translate incoming data packets from the external network communications protocol to the private address space of the data center network. The data center networks may also intercommunicate via one or more communications channels, paths, or pipes.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may manage how network traffic is processed in a network. Networks use various network traffic processing devices (NTPDs) to perform various network processing functions (e.g., firewall functions, intrusion prevention functions, intrusion detection functions, load balancing functions, application delivery controller functions, routing functions, virtual private networking functions, packet encryption functions, packet encapsulation functions, etc.). However, making configuration changes to such devices may, in some cases, risk incorrect treatment of some network transmissions, potentially causing errors in the network. For example, a configuration change to a firewall of a network may result in the firewall incorrectly rejecting all network transmissions sent to devices of the network. Accordingly, to avoid such errors, configurability of some NTPDs may be reduced.

As described herein, one way to reduce an impact of a configuration change may be to form a virtual distributed system using an NTPD. In some embodiments, the NTPD may implement a plurality of virtual network traffic processing devices (VNTPDs) that each implement a respective version of a network processing function. The NTPD may spread received network transmissions between the VNTPDs. Configuration changes may be made to one VNTPD without making changes to other VNTPDs such that the NTPD, via corresponding VNTPDs, performs different versions of the network processing function. As a result, configuration changes may be, at least initially, applied on a smaller scale before such changes affect how the NTPD as a whole treats received network transmissions. Accordingly, administrators may more freely change the functions of the NTPD, as compared to a system where the NTPD does not implement a plurality of VNTPDs. Further, because the VNTPDs are all implemented by the same NTPD, monitoring and control decisions with regard to the VNTPDs may be simplified.

In various embodiments, a NTPD may use monitored results of the VNTPDs to perform at least one of two processes in response to a network transmission: controlling output of the network transmission or determining a configuration change for one or more of the VNTPDs. Examples of each of these processes will be described further below.

Figure 1:
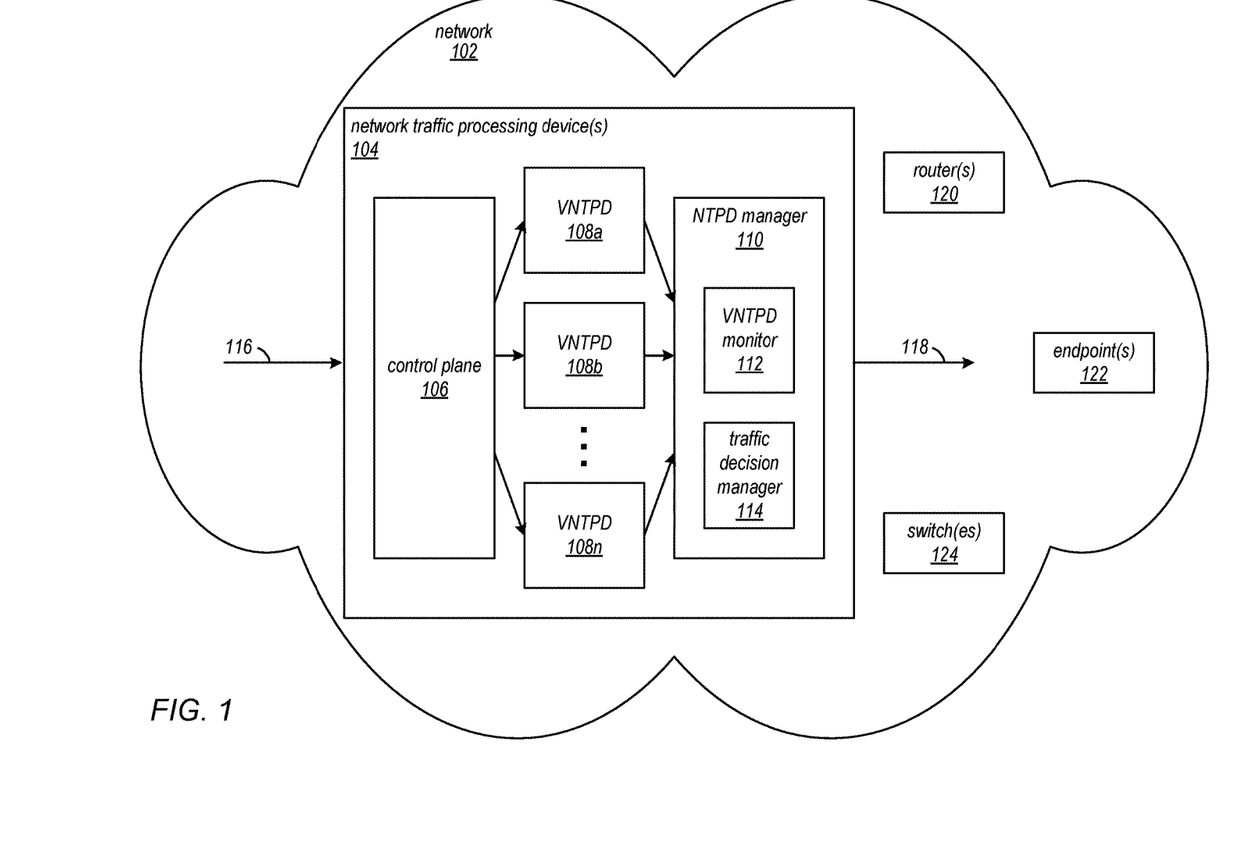
FIG. 1 is a block diagram illustrating an example system that controls output of a network transmission processed by a network traffic processing device.

FIG. 1 is a block diagram illustrating an example system that controls output of a network transmission processed by a network traffic processing device (NTPD). The system includes network 102, NTPD(s) 104, router(s) 120, endpoint(s) 122, and switch(es) 124. The NTPD(s) 104 includes control plane 106, and NTPD manager 110. In the illustrated embodiment, NTPD(s) 104 implements virtual network traffic processing devices (VNTPDs) 108a-n. NTPD manager 110 includes VNTPD monitor 112 and traffic decision manager 114. As described below with reference to FIG. 4, in some embodiments, the system of FIG. 1 is part of one or more network-based services. However, in other embodiments, the system of FIG. 1 is part of a closed network.

NTPD(s) 104 may receive network transmission 116, may perform various network processing functions (via one or more of VNTPDs 108a-n) and may control output of network transmission 118. In some embodiments, NTPD(s) 104 may be dedicated devices that perform a specific network processing function. In other embodiments, NTPD(s) 104 may perform multiple network processing functions. As further described with reference to FIG. 4, in some embodiments, network 102 may include multiple NTPD(s) 104 that each perform a different network processing function. In various embodiments, the network processing function may be at least one of a firewall function, an intrusion prevention function, an intrusion detection function, a load balancing function, an application delivery controller function, a routing function, a virtual private networking function, a packet encryption function, or a packet encapsulation function. In some embodiments, network transmission 116 may be received from a device external to network 102 and may address a device in network 102 (e.g., endpoint 122). In other embodiments, network transmission 116 may be received from a device in network 102 and may address a device external to network 102. In other embodiments, network transmission 116 may be received from a device in network 102 and may address another device in network 102.

Control plane 106 may receive an indication of network transmission 116 and may select, based on a management policy corresponding to VNTPDs 108*a-n*, a plurality of VNTPDs 108*a-n* to perform respective versions of a network processing function of NTPD 104 on network transmission 116. As described further below with respect to FIG. 3, the management policy may specify one or more rules for how a series of network transmissions should be distributed between the VNTPDs 108*a-n*. In some cases, the network transmission 116 may be part of a packet flow. Accordingly, in some embodiments, depending on the network processing function being performed by the NTPD, control plane 206 may include stateful information for the packet flow that ensures that packets for the flow are passed through the same set of one or more VNTPDs.

VNTPDs 108*a-n* may, in response to receiving a network transmission (e.g., network transmission 116), perform respective versions of a network processing function. For example, NTPD 104 may implement a firewall function and control plane 106 may select VNTPDs 108*a*, 108*b*, and 108*n* to perform respective versions of a firewall function on network transmission 116. In some embodiments, at least two of VNTPDs 108*a-n* may implement different versions of the network processing function. For example, VNTPD 108*a* and VNTPD 108*b* may implement different versions of a firewall and may have different rules for determining whether a network transmission should be forwarded to another device (e.g., an endpoint 122) in network 102. In other embodiments, VNTPDs 108*a-n* may implement the same version of the network processing function (e.g., prior to a configuration update at one or more of VNTPDs 108*a-n*).

VNTPD monitor 112 may monitor results of VNTPDs 108*a-n* performing the respective versions of the network processing function. Traffic decision manager 114 may control, based on a traffic policy, output of the network transmission 118. In some embodiments, the network transmission 118 may be the network transmission 116. For example, to continue the firewall example above, if VNTPDs 108*a*, 108*b*, and 108*n* all approve the network transmission 116 (e.g., indicate that the network transmission 116 should be forwarded to a device indicated by the network transmission 116), then traffic decision manager 114 may output the network transmission 116 as network transmission 118 to a device (e.g., endpoint 122) addressed by the network transmission 116. If all of the VNTPDs 108*a*, 108*b*, and 108*n* reject the network transmission 116, in some embodiments, traffic decision manager 114 may output an error message. Alternatively, traffic decision manager 114 may simply reject the network transmission 116 (e.g., not outputting anything). If some VNTPDs 108*a-n* approve a network transmission and other VNTPDs 108*a-n* reject the network transmission, the traffic policy may indicate (e.g., may specify one or more rules for) how the network transmission should be processed. For example, the traffic policy may indicate that the network transmission 116 should be forwarded to a device addressed by the network transmission 116 if at least one of the VNTPDs 108*a-n* approves the network transmission 116. Alternatively, the traffic policy may indicate that the network transmission 116 should be forwarded to a device indicated by the network transmission only if all of the VNTPDs 108*a-n* used to process the network transmission 116 approve the network transmission 116. As another example, the traffic policy may indicate that the network transmission 116 should be forwarded to a device indicated by the network transmission if a majority of the VNTPDs 108*a-n* used to process the network transmission approve the network transmission 116. In some embodiments, the traffic policy may indicate a process for selecting results of one of the VNTPDs 108*a-n* to output. Other traffic policies may also be used (e.g., a priority-based policy, a threshold voting policy, etc.). In some embodiments, the traffic policy may be part of the management policy. Alternatively, the traffic policy may be separate from the management policy. Accordingly, multiple different versions of a network traffic processing function may be used together to control output of a network transmission.

Figure 2:
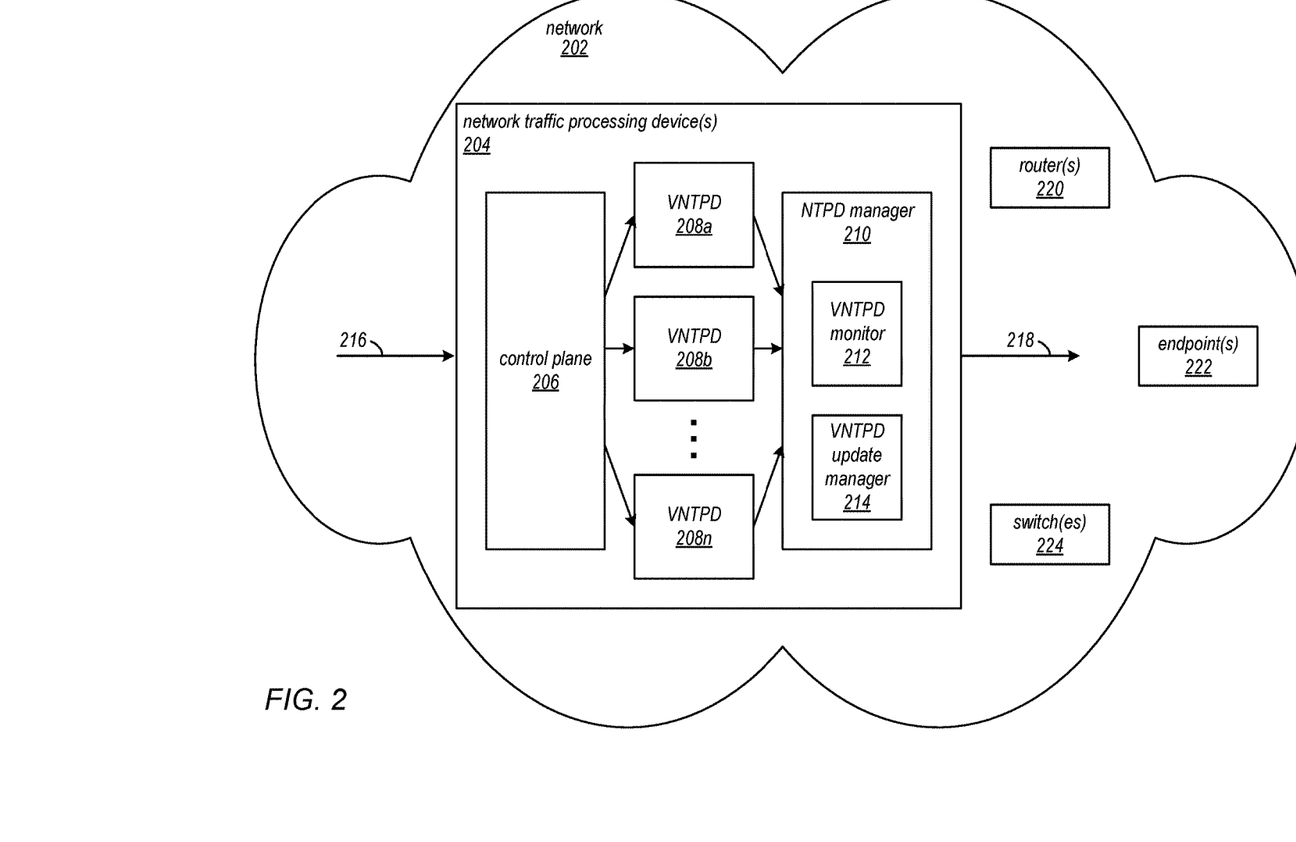
FIG. 2 is a block diagram illustrating an example system that determines a configuration change of one or more virtual network traffic processing devices implemented by a network traffic processing device.

FIG. 2 is a block diagram illustrating an example system that determines a configuration change of one or more virtual network traffic processing devices (VNTPDs) implemented by a network traffic processing device (NTPD). The system includes network 202, NTPD(s) 204, router(s) 220, endpoint(s) 222, and switch(es) 224. NTPD(s) 204 includes control plane 206, and NTPD manager 210. In the illustrated embodiment, NTPD(s) 204 implements virtual network traffic processing devices (VNTPDs) 208*a-n*. NTPD manager 210 includes VNTPD monitor 212 and VNTPD update manager 214. In various embodiments, portions of the system of FIG. 2 may correspond to or may operate similarly to respective portions of the system described above with reference to FIG. 1. As described below with reference to FIG. 4, in some embodiments, the system of FIG. 2 is part of one or more network-based services. However, in other embodiments, the system of FIG. 2 is part of a closed network.

NTPD(s) 204 may receive network transmission 216, may perform various network processing functions (via one or more of VNTPDs 208*a-n*) and may control output of network transmission 218. In some embodiments, NTPD(s) 204 may be dedicated devices that perform a specific network processing function. In other embodiments, NTPD (s) 204 may perform multiple network processing functions. As further described with reference to FIG. 4, in some embodiments, network 202 may include multiple NTPD(s) 204 that each perform a different network processing function. In various embodiments, the network processing function may be at least one of a firewall function, an intrusion prevention function, an intrusion detection function, a load balancing function, an application delivery controller function, a routing function, a virtual private networking function, a packet encryption function, or a packet encapsulation function. In some embodiments, network transmission 216 may be received from a device external to network 202 and may address a device in network 202 (e.g., endpoint 222). In other embodiments, network transmission 216 may be received from a device in network 202 and may address a device external to network 202. In other embodiments, network transmission 216 may be received from a device in network 202 and may address another device in network 202.

Control plane 206 may receive an indication of network transmission 216 and may select, based on a management policy corresponding to VNTPDs 208a-n, one or more of VNTPDs 208a-n to perform respective versions of a network processing function of NTPD 204 on network transmission 216. As described further below with respect to FIG. 3, the management policy may specify one or more rules for how a series of network transmissions should be distributed between the VNTPDs 208a-n. In some cases, the network transmission 216 may be part of a packet flow. Accordingly, in some embodiments, depending on the network processing function being performed by the NTPD, control plane 206 may include stateful information for the packet flow that ensures that packets for the flow are passed through the same set of one or more VNTPDs.

VNTPDs 208a-n may, in response to receiving a network transmission (e.g., network transmission 216), perform respective versions of a network processing function. For example, NTPD 204 may implement a firewall function and control plane 206 may select VNTPDs 208a, 208b, and 208n to perform respective versions of a firewall function on network transmission 216. In some embodiments, at least two of VNTPDs 208a-n may implement different versions of the network processing function. For example, VNTPD 208a and VNTPD 208b may implement different versions of a firewall and may have different rules for determining whether a network transmission should be forwarded to another device (e.g., an endpoint 222) in network 202. In other embodiments, VNTPDs 208a-n may implement the same version of the network processing function (e.g., prior to a configuration update at one or more of VNTPDs 208a-n).

VNTPD monitor 212 may monitor results of VNTPDs 208a-n performing the respective versions of the network processing function. VNTPD update manager 214 may, in some cases, determine a configuration change for at least one of VNTPDs 208a-n based on an update policy. The update policy may indicate a process for (e.g., may specify one or more rules for) making at least one configuration change at one or more of VNTPDs 208a-n. The configuration change may modify a respective version of the network processing function performed by at least one of VNTPDs 208a-n to be unique (e.g., different from the respective versions of the network processing function performed by the other VNTPDs 208a-n). Alternatively, the configuration change may modify a respective version of the network processing function performed by at least one of VNTPDs 208a-n to be the same as a different network processing function performed by one or more other VNTPDs of VNTPDs 208a-n. For example, to continue the firewall example above, after confirming that a configuration change to VNTPD 208a (e.g., a change in a respective version of the network processing function) does not cause an error after VNTPD 208a processes requests for a day, VNTPD update manager 214 may determine that VNTPD 208b should also receive the configuration change. In some embodiments, VNTPD update manager 214 may determine that multiple VNTPDs of VNTPDs 208a-n should receive the configuration change. In some cases, VNTPD update manager 214 indicates the configuration change to VNTPDs 208a-n directly. In other embodiments, VNTPD update manager 214 indicates the configuration change to another device (e.g., a portion of control plane 206). Alternatively, the configuration change may be an instruction to revert a previous configuration change (e.g., based on determining that the previous configuration change caused an error). In some embodiments, the update policy may be part of the management policy. Alternatively, the update policy may be separate from the management policy. Accordingly, multiple different versions of a network traffic processing function may be used together to control output of a network transmission.

Figure 3:
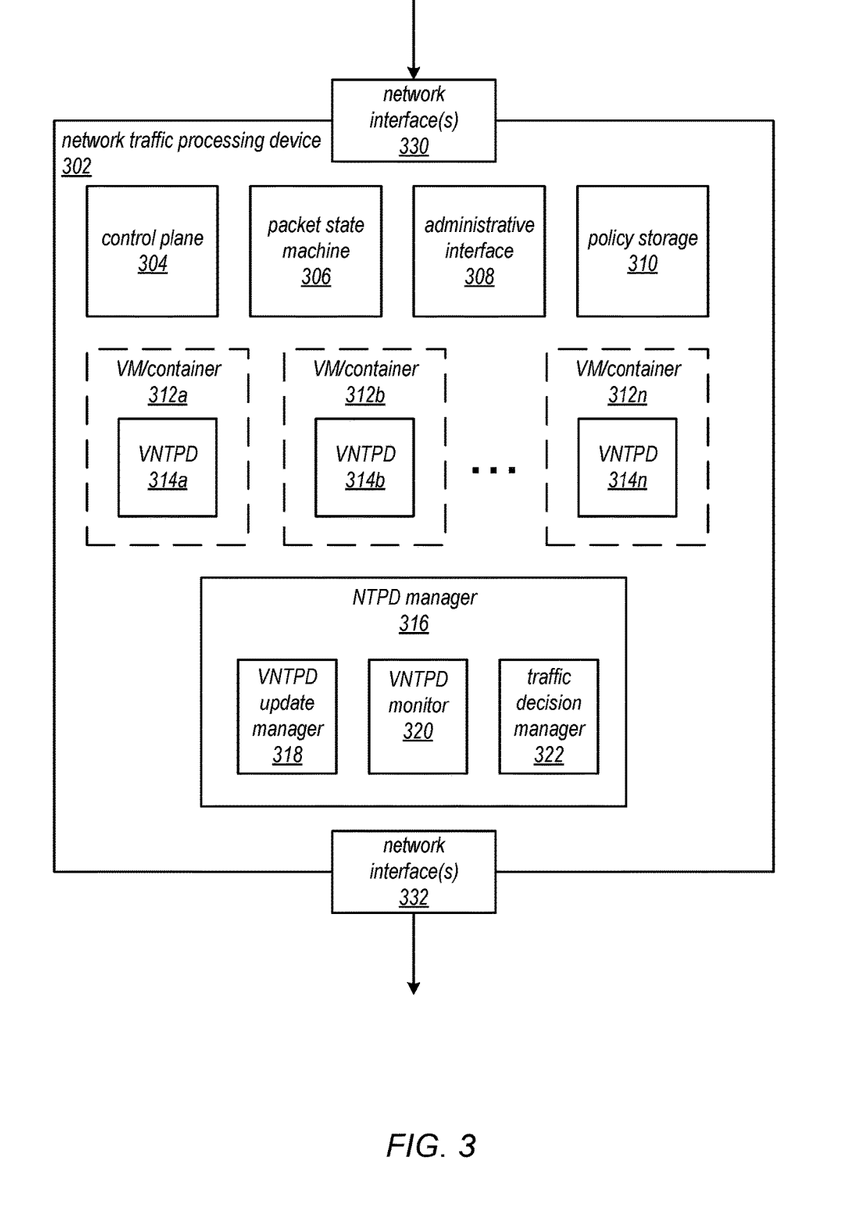
FIG. 3 is a block diagram illustrating an example network traffic processing device.

FIG. 3 is a block diagram illustrating an example network traffic processing device (NTPD) 302. In the illustrated embodiment, NTPD 302 includes control plane 304, packet state machine 306, administrative interface 308, policy storage 310, NTPD manager 316, and network interface(s) 330 and 332. Additionally, NTPD 302 implements VM/containers 312a-n. VM/containers 312a-n implement respective virtual network traffic processing devices (VNTPDs) 314a-n. In various embodiments, portions of the system of FIG. 3 may correspond to or may operate similarly to respective portions of the system described above with reference to FIG. 1, FIG. 2, or both. In some embodiments, NTPD 302 may be any device that includes one or more processors and one or more memory instructions that are configured to perform the processes described herein. In some embodiments, other devices are further included in NTPD 302 (e.g., one or more hypervisors that manages execution by VM/containers 312a-n).

NTPD 302 may receive, at administrative interface 308 via network interface(s) 330, network interface(s) 332, or both, one or more policies. In some embodiments, the one or more policies may be received from an administrator of a network associated with NTPD 302. The one or more policies may be stored at policy storage 310. In other embodiments, the policies may be stored at one or more other devices of NTPD 302 (e.g., control plane 304, VNTPD update manager 318, traffic decision manager 322, or another device). The one or more policies may be stored together or separately. The one or more policies may be a management policy, a traffic policy, or an update policy. As described above, in some embodiments, the management policy may include the traffic policy, the update policy, or both. The management policy may indicate a process for distributing network transmissions between VNTPDs 314a-n. For example, the management policy may indicate that network transmissions should be provided to the VNTPDs in a round robin manner (e.g., spread evenly). As another example, the management policy may indicate that a particular VNTPD (e.g., VNTPD 314a) should receive a particular percentage of network transmissions (e.g., 10%). As another example, the management policy may indicate that network transmissions having a particular format (e.g., https requests) should be provided to a particular VNTPD (e.g., VNTPD 314a). As another example, the management policy may indicate that network transmissions received via a particular application specific metric (e.g., via a particular source or destination port, that include particular data in a header, that include particular data in a deep packet inspection, etc.) should be provided to a particular VNTPD (e.g., VNTPD 314a). As another example, the management policy may indicate that network transmissions should only be provided to VNTPDs configured to perform particular versions of the network processing function (e.g., VNTPDs having particular configuration change(s)). In some embodiments, the management policy may indicate that multiple criteria should be used to determine which VNTPD(s) should receive a particular network transmission. The traffic policy may indicate a process for controlling an output of NTPD 302. For example, the traffic policy may indicate that, when certain conditions are met (e.g., multiple VNTPDs receive a network transmission and only VNTPD 314*a* approves of the network transmission), an output of a particular VNTPD (e.g., VNTPD 314*a*) should be used. Alternatively, as another example, the traffic policy may indicate that when certain conditions are met (e.g., multiple VNTPDs receive a network transmission and only VNTPD 314*a* approves of the network transmission), an error message or no message should be output. The update policy may indicate a process for making at least one configuration change at one or more of VNTPDs 314*a-n*, where the at least one configuration change modifies a respective version of a network processing function performed by the one or more of VNTPDs 314*a-n*.

NTPD 302 may receive, via network interface(s) 330 one or more network transmissions. As discussed above with reference to FIGS. 1 and 2, based on the one or more network transmissions, NTPD 302 may control output of the one or more network transmissions (e.g., via network interface(s) 332), determine a configuration change for one or more of VNTPDs 314*a-n*, or both. NTPD 302 may forward the one or more network transmissions to control plane 304.

For a particular network transmission, control plane 304 may select, based on the management policy, one or more of VNTPDs 314*a-n* to perform a version of a network processing function on the network transmission. In some cases, as described below, control plane 304 may also use information stored at packet state machine 306 to select the one or more of VNTPDs 314*a-n*. Additionally, control plane 304 may manage deployment of various functions performed by NTPD 302. For example, control plane 304 may, in some cases, ensure that the various portions of NTPD 302 communicate correctly. Additionally, in some cases, control plane 304 may instruct various portions of NTPD 302 to perform various other functions, such as one or more update functions or one or more other applications. As noted above, in some cases, NTPD 302 may implement multiple different application functions at respective VNTPDs of VNTPDs 314*a-n*. Control plane 304 may control communication between the respective VNTPDs 314*a-n*.

As noted above, in some cases, network transmissions may be part of various packet flows. In some cases, it may be desirable to send the packet flows through the same network path. Packet state machine 306 may monitor the network paths (e.g., VNTPDs of VNTPDs 314*a-n* assigned) for a particular packet flow. Accordingly, when a network transmission of the particular packet flow is identified, packet state machine 306 may identify the one or more of VNTPDs 314*a-n* previously assigned to perform a respective version of the network processing function on other network transmissions in the packet flow.

VM/containers 312*a-n* may implement separate virtual machines or containers that each include a respective VNTPD of VNTPDs 314*a-n*. In some embodiments, VM/containers 312*a-n* may be unaware of each other. Additionally, in some cases, the respective VNTPDs 314*a-n* may perform different versions of a network processing function on a received network transmission. In some embodiments, one or more of VNTPDs 314*a-n* may implement a different network processing function.

NTPD manager 316 may receive one or more outputs from VNTPDs 314*a-n* and may perform an analysis on the one or more outputs to, in some cases, determine a configuration change for at least one of the VNTPDs 314*a-n*, to control output of the NTPD in response to the network transmission, or both. In particular, as discussed above, VNTPD monitor 320 may monitor the outputs of VNTPDs 314*a-n*. Because VNTPD monitor 320 and VNTPDs 314*a-n* are all implemented by NTPD 302, monitoring the outputs, analyzing the outputs, and making configuration changes at the various VNTPDs 314*a-n* may be simplified. VNTPD update manager 318 may, based on an update policy and based on the monitored results, determine a configuration change for one or more of VNTPDs 314*a-n* (e.g., based on several network transmissions processed by one or more of VNTPDs 314*a-n*). Traffic decision manager 322 may, based on a traffic policy and based on the monitored results, control output of the network transmission.

Accordingly, NTPD 302 may appear as a traditional NTPD, but, because VNTPDs 314*a-n* are implemented as multiple instances of the network function, these instances may be controlled separately, enabling various configuration changes to be made gradually or with additional testing. Additionally, the functions of the device may be further customized, as compared to an NTPD that does not implement VNTPDs. Further, various monitoring and output analysis functions (e.g., performed by NTPD manager 316) may be simplified because such functions are performed within NTPD 302.

Figure 4:
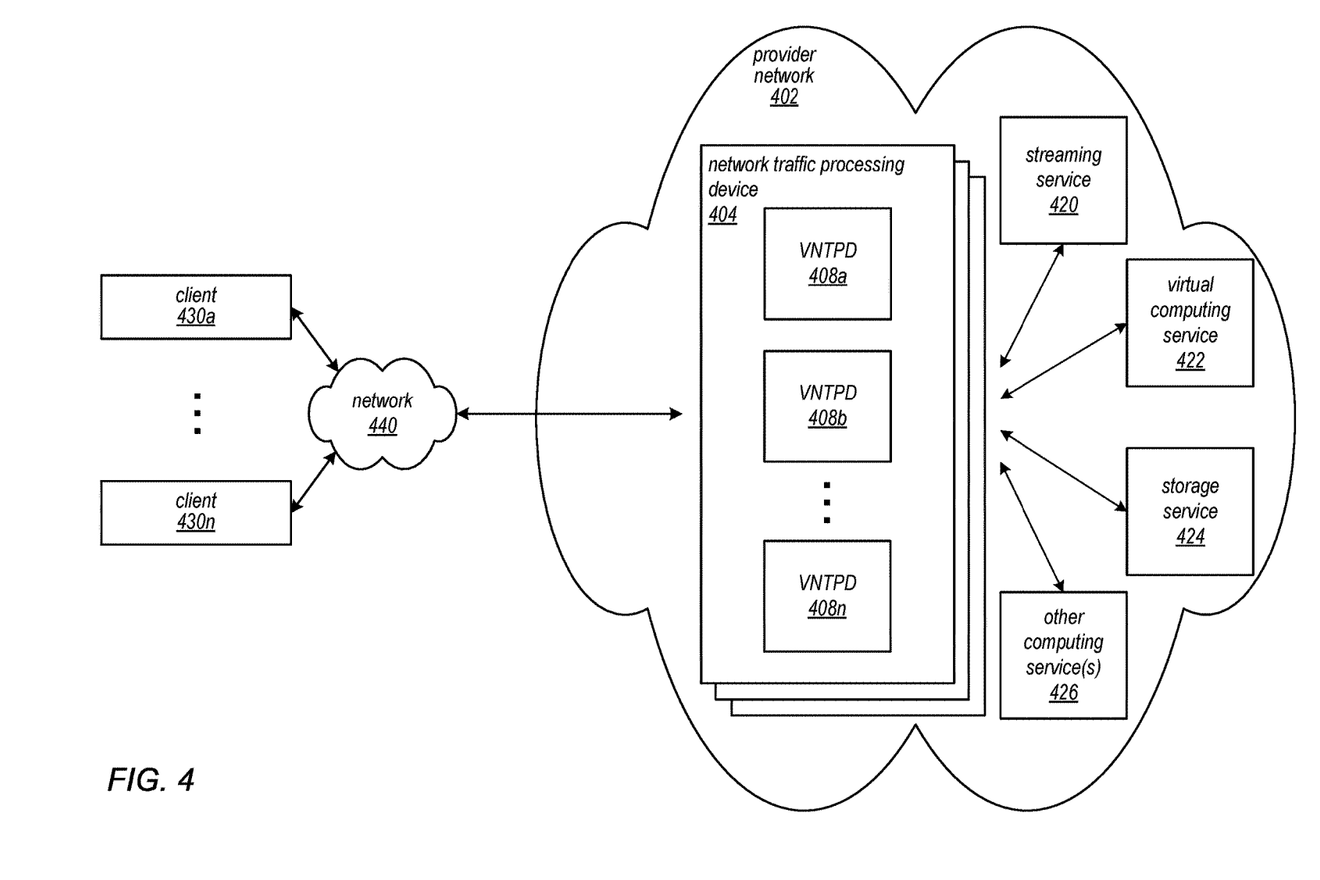
FIG. 4 is a block diagram illustrating a network-based service system architecture that includes one or more network traffic processing devices.

FIG. 4 is a block diagram illustrating a network-based service system architecture that includes one or more network traffic processing devices (NTPDs), according to some embodiments. The network-based system includes a plurality of clients 430*a-n* that can interact with a provider network 402 via a network 440. The provider network 402 includes one or more NTPDs 404 and various network-based services, such as streaming service 420, virtual computing service 422, storage service 424, and other computing services 426. The one or more NTPDs 404 may implement respective virtual network traffic processing devices (VNTPDs) 408*a-n*. In some embodiments, the one or more NTPDs 404 may implement different network processing functions. For example, one NTPD may implement an edge router function and another NTPD may implement a load balancer function. In some embodiments, streaming service 420, virtual computing service 422, storage service 424, and other computing services 426 may include or otherwise use one or more of router(s) 120, endpoint(s) 122, or switch(es) 124 of FIG. 1 and/or one or more of router(s) 220, endpoint(s) 222, or switch(es) 224 of FIG. 2.

Provider network 402 may be set up by an entity such as a company or a public sector organization to provide one or more services (such as various types of cloud-based storage or computing services) accessible via the Internet and/or other networks (e.g., collectively corresponding to provider network 402) to clients 430*a-n*. In some embodiments, provider network may include the hardware (e.g., modems, routers, switches, load balancers, proxy servers, etc.) and software (e.g., protocol stacks, accounting software, firewall/security software, etc.) necessary to establish a networking links between different components of provider network, as well as external networks (e.g., the Internet). Provider network 402 may include numerous data centers hosting various resource pools, such as collections of physical and/or virtualized computer servers, storage devices, networking equipment, etc. used to implement and distribute the infrastructure and services offered by the provider network 402. Provider network 402 may forward various network transmissions between clients 430*a-n* and various services (e.g., streaming service 420) or may forward network transmissions between services (e.g., between streaming service 420 and virtual computing service 422). Network processing functions may be performed on the network transmissions by one or more of VNTPDs 408*a-n* implemented by NTPDs 404 in a manner described above.

Clients 430*a-n* may encompass any type of client configurable to submit requests to provider network 402. For example, client 430*a* may include a suitable version of a web browser, or may include a plug-in module or other type of code module configured to execute as an extension to or within an execution environment provided by a web browser. Alternatively, client 430*b* may encompass an application such as a computing resource tool or application (or user interface thereof), a media application, an office application or any other application that may make interact with streaming service 420, virtual computing service 422, storage service 424, or other computing service(s) 426 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 430*a-n* may be configured to generate network-based services requests according to a Representational State Transfer (REST)-style network-based services architecture, a document- or message-based network-based services architecture, or another suitable network-based services architecture.

Clients 430*a-n* may convey network-based services requests to provider network 402 via network 440. In various embodiments, network 440 may encompass any suitable combination of networking hardware and protocols necessary to establish network-based communications between clients 430*a-n* and provider network 402. For example, network 440 may generally encompass the various telecommunications networks and service providers that collectively implement the Internet. Network 440 may also include private networks such as local area networks (LANs) or wide area networks (WANs) as well as public or private wireless networks. For example, both client 430*a* and provider network 402 may be respectively provisioned within enterprises having their own internal networks. In such an embodiment, network 440 may include the hardware (e.g., modems, routers, switches, load balancers, proxy servers, etc.) and software (e.g., protocol stacks, accounting software, firewall/security software, etc.) necessary to establish a networking link between client 430*a* and the Internet as well as between the Internet and provider network 402. It is noted that in some embodiments, clients 430*a-n* may communicate with provider network 402 using a private network rather than the public Internet.

Figure 5:
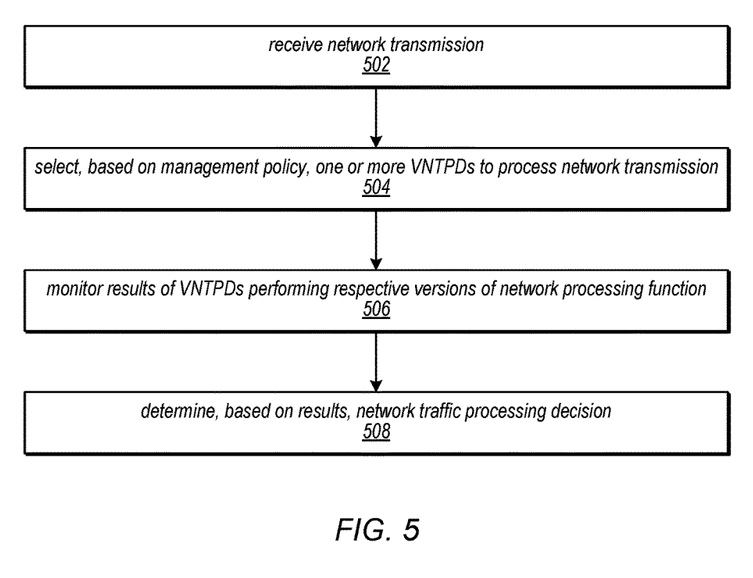
FIG. 5 is a flow diagram illustrating one embodiment of a method for determining a network traffic processing decision for a network transmission.

As described above, a network traffic processing device (NTPD) may be used to determine network traffic processing decisions based on a network transmission. One embodiment of a method for determining a network traffic processing decision for a network transmission is illustrated by the flow diagram of FIG. 5. Although FIG. 5 illustrates operations being performed in a particular order, in other embodiments, some operations may be performed in other orders or in parallel.

As illustrated at 502, in this example, the method may include receiving a network transmission. For example, NTPD 302 may receive a network transmission. As illustrated at 504, in this example, the method may include selecting, based on a management policy, one or more virtual network traffic processing devices (VNTPDs) to process the network transmission. For example, control plane 304 may select, based on a management policy stored at policy storage 310, VNTPDs 314*a*, 314*b*, and 314*n* to process the network transmission.

As illustrated at 506, in this example, the method may include monitoring results of the VNTPDs performing respective versions of the network processing function. For example, VNTPD monitor 320 may monitor results of VNTPDs 314*a*, 314*b*, and 314*n* performing respective versions of the network processing function. As illustrated at 508, in this example, the method may include determining, based on the results, a network traffic processing decision. For example, based on the results, NTPD manager 316 may make a network traffic processing decision, such as determining a configuration change for one or more of VNTPDs 314*a-n* or controlling output of the network transmission. Thus, the method of FIG. 5 may enable determining a network traffic processing decision for a network transmission.

Figure 6:
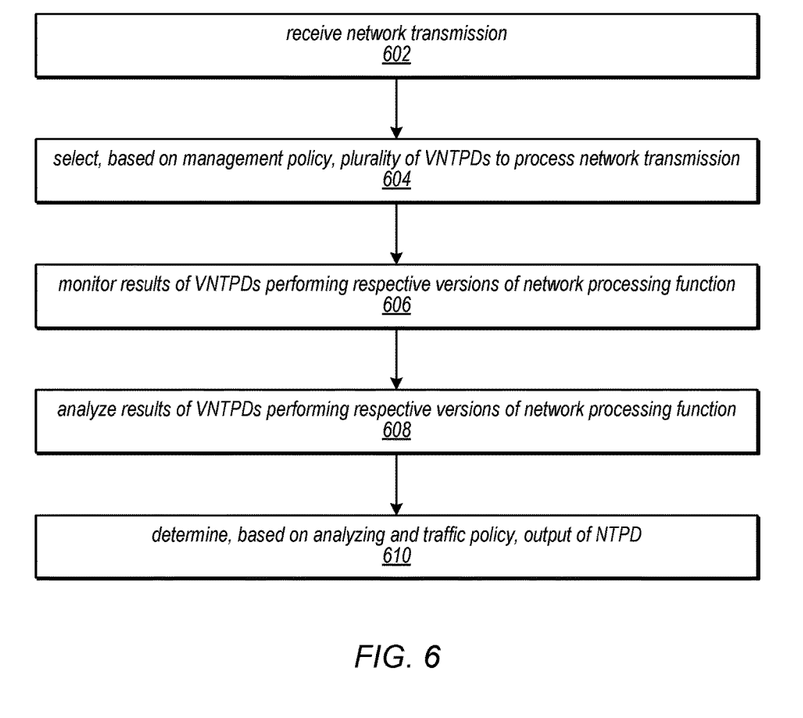
FIG. 6 is a flow diagram illustrating one embodiment of a method for determining an output of a network traffic processing device in response to a network transmission.

As described above, a network traffic processing device (NTPD) may be used to determine an output based on a network transmission. One embodiment of a method for determining an output of a network traffic processing device in response to a network transmission is illustrated by the flow diagram of FIG. 6. Although FIG. 6 illustrates operations being performed in a particular order, in other embodiments, some operations may be performed in other orders or in parallel.

As illustrated at 602, in this example, the method may include receiving a network transmission. For example, NTPD 302 may receive a network transmission. As illustrated at 604, in this example, the method may include selecting, based on a management policy, a plurality of virtual network traffic processing devices (VNTPDs) to process the network transmission. For example, control plane 304 may select, based on a management policy stored at policy storage 310, VNTPDs 314*a*, 314*b*, and 314*n* to process the network transmission.

As illustrated at 606, in this example, the method may include monitoring results of the VNTPDs performing respective versions of the network processing function. For example, VNTPD monitor 320 may monitor results of VNTPDs 314*a*, 314*b*, and 314*n* performing respective versions of the network processing function. As illustrated at 608, in this example, the method may include analyzing results of the VNTPDs performing respective versions of the network processing function. For example, traffic decision manager 322 may analyze the results of VNTPDs 314*a*, 314*b*, and 314*n* performing respective versions of the network processing function.

As illustrated at 610, in this example, the method may include determining, based on the analyzing and a traffic policy, an output of the NTPD. For example, based on the results, traffic decision manager 322 may determine an output of the NTPD 302, such as outputting the network transmission or outputting an error message. Thus, the method of FIG. 6 may enable determining an output of a network traffic processing device in response to a network transmission.

Figure 7:
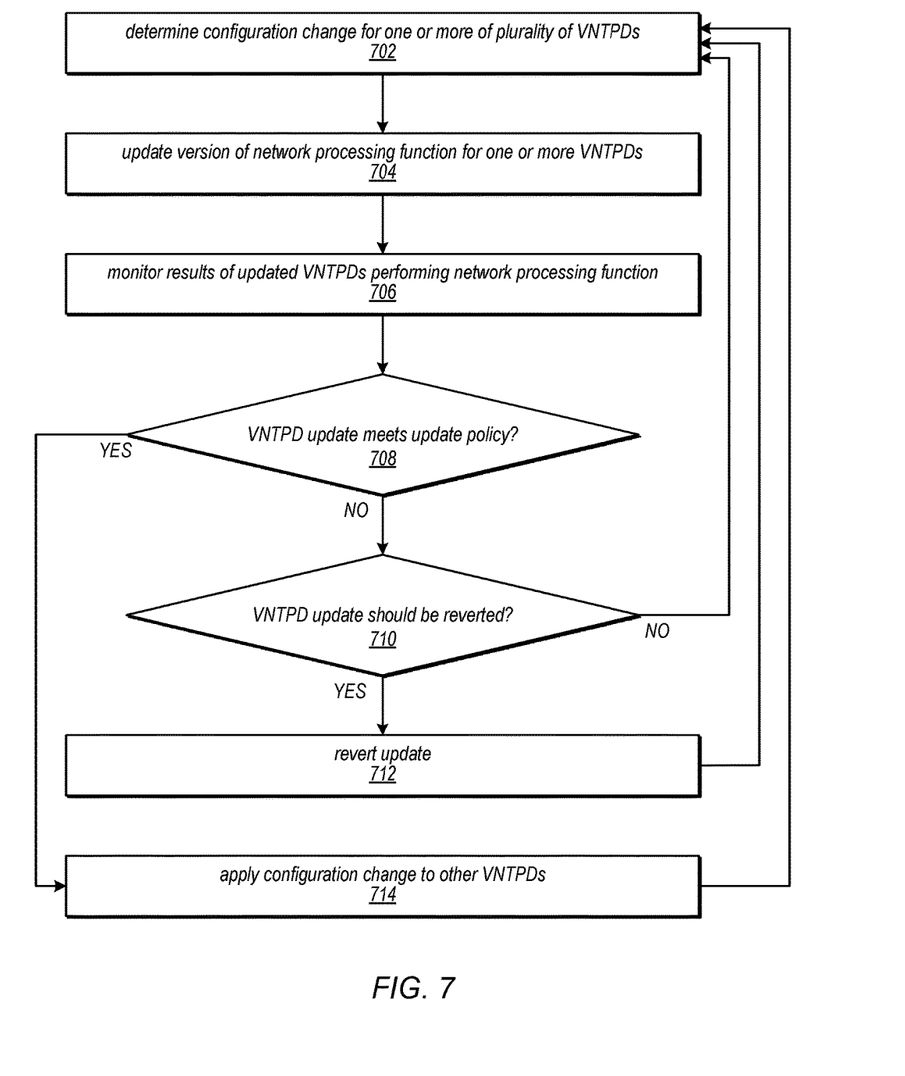
FIG. 7 is a flow diagram illustrating one embodiment of a method for determining whether to apply a configuration change to one or more virtual network traffic processing devices.

As described above, a network traffic processing device (NTPD) may be used to determine a configuration change for one or more virtual network traffic processing devices (VNTPDs) based on one or more network transmissions. One embodiment of a method for determining whether to apply a configuration change to one or more virtual network traffic processing devices is illustrated by the flow diagram of FIG. 7. Although FIG. 7 illustrates operations being performed in a particular order, in other embodiments, some operations may be performed in other orders or in parallel.

As illustrated at 702, in this example, the method may include determining a configuration change for one or more of a plurality of VNTPDs. For example, NTPD 302 may determine a configuration change for VNTPD 314*a* based on one or more instructions received via administrative interface 308. As illustrated at 704, in this example, the method may include updating a version of a network processing function for the one or more VNTPDs. For example, NTPD 302 may update the version of the network processing function for VNTPD 314*a* via VM/container 312*a*.

As illustrated at 706, in this example, the method may include monitoring results of the updated VNTPDs performing respective versions of the network processing function. For example, VNTPD monitor 320 may monitor results of VNTPD 314*a* performing a respective version of the network processing function. As illustrated at 708, the method may include determining whether the VNTPD update meets an update policy.

As illustrated at 710, in this example, in response to determining that the VNTPD update does not meet the update policy, the method may include determining whether the VNTPD update should be reverted. In this example, in response to determining that the VNTPD update should not be reverted, the method returns to 702. As illustrated at 712, in this example, in response to determining that the VNTPD update should be reverted, the method may include reverting the update. For example, in response to determining that an update should be reverted, VNTPD update manager 318 may instruct VNTPD 314*a* (e.g., directly or via another device such as control plane 304 or VM/container 312*a*) to revert the update. After reverting the update, the method returns to 702.

As illustrated at 714, in this example, in response to determining, at 708, that the VNTPD update meets the update policy, the method may include applying a configuration change to one or more other VNTPDs. For example, in response to determining that the VNTPD update to VNTPD 314*a* meets (e.g., satisfies) the update policy, VNTPD update manager 318 may apply a configuration change to one or more of VNTPDs 314*b*-314*n* (e.g., directly or via another device such as control plane 304 or VM/container 312*a*). After applying the configuration change, the method returns to 702. Thus, the method of FIG. 7 may enable determining whether to apply a configuration change to one or more virtual network traffic processing devices.

Figure 8:
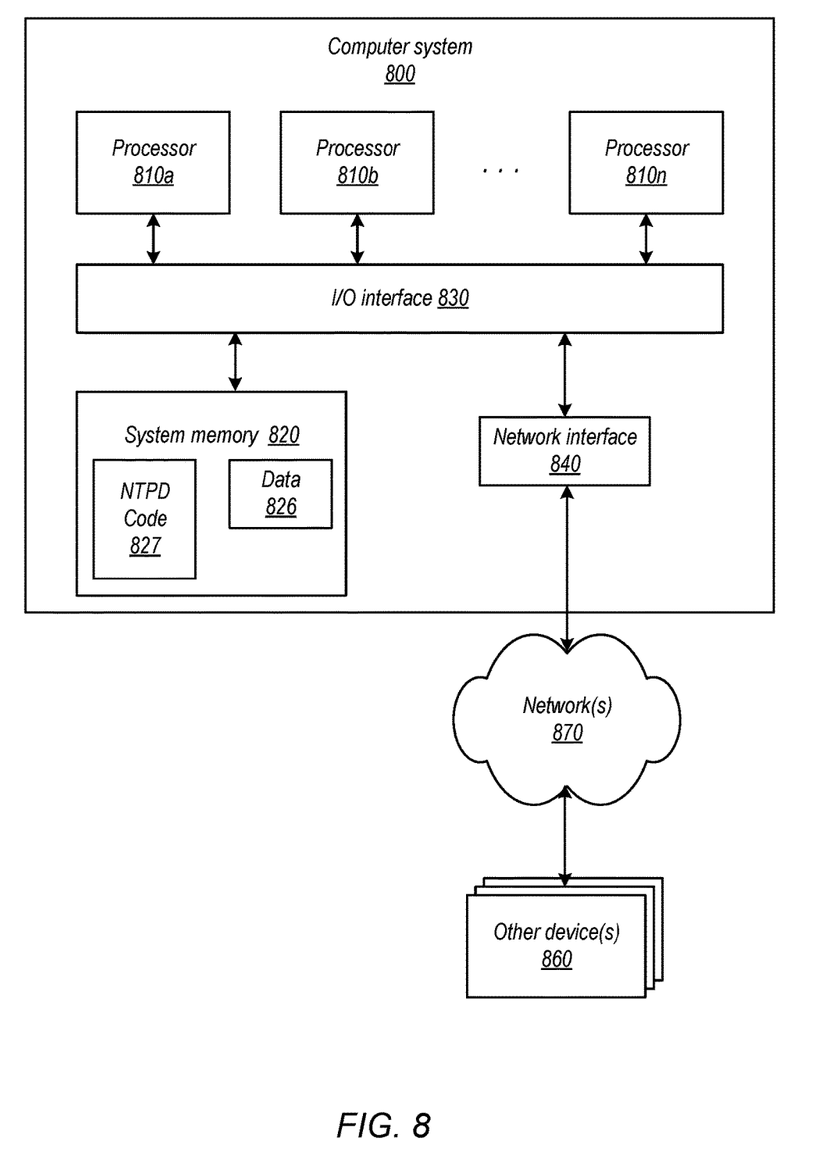
FIG. 8 is a block diagram illustrating one embodiment of a computer system configured to implement at least a portion of a network traffic processing device, as described herein.

One embodiment of a computer system configured to implement at least a computer system configured to implement at least a portion of a network traffic processing device (NTPD) as described above with reference to FIGS. 1-7 is shown in FIG. 8. In at least some embodiments, a server that implements a portion or all of the NTPD as described herein may include a general-purpose computer system that includes or is configured to access one or more computer-accessible media, such as a computer system 800 illustrated in FIG. 8. In the illustrated embodiment, the computer system 800 includes one or more processors 810*a*-*n* coupled to a system memory 820 via an input/output (I/O) interface 830. The computer system 800 further includes a network interface 840 coupled to the I/O interface 830.

In various embodiments, the computer system 800 may be a uniprocessor system including one processor 810*a*, or a multiprocessor system including several processors 810*a*-*n* (e.g., two, four, eight, or another suitable number). The processors 810*a*-*n* may be any suitable processors capable of executing instructions. For example, in various embodiments, the processors 810*a*-*n* may be general-purpose or embedded processors implementing any of a variety of instruction set architectures (ISAs), such as the x86, PowerPC, SPARC, or MIPS ISAs, or any other suitable ISA. In multiprocessor systems, each of the processors 810*a*-*n* may commonly, but not necessarily, implement the same ISA.

System memory 820 may be configured to store instructions and data accessible by the processor(s) 810. In various embodiments, the system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for implementing a data storage management system, are shown stored within the system memory 820 as NTPD code 827 and data 826. For example, the NTPD code 827 may, when executed by a processor, cause the processor to implement at least a portion of functions of the NTPD(s) 104, the NTPD(s) 204, the NTPD 302, the NTPD(s) 404 or any combination thereof.

In one embodiment, the I/O interface 830 may be configured to coordinate I/O traffic between a processor 810, the system memory 820, and any peripheral devices in the device, including the network interface 840 or other peripheral interfaces. In some embodiments, the I/O interface 830 may perform any necessary protocol, timing or other data transformations to convert data signals from one component (e.g., the system memory 820) into a format suitable for use by another component (e.g., a processor 810). In some embodiments, the I/O interface 830 may include support for devices attached through various types of peripheral buses, such as a variant of the Peripheral Component Interconnect (PCI) bus standard or the Universal Serial Bus (USB) standard, for example. In some embodiments, the function of the I/O interface 830 may be split into two or more separate components, such as a north bridge and a south bridge, for example. Also, in some embodiments some or all of the functionality of the I/O interface 830, such as an interface to the system memory 820, may be incorporated directly into a processor 810.

The network interface 840 may be configured to allow data to be exchanged between the computer system 800 and other devices 860 attached to a network or networks 870, such as other computer systems or devices as illustrated or described in FIGS. 1 through 7, for example. In various embodiments, the network interface 840 may support communication via any suitable wired or wireless general data networks, such as types of Ethernet network, for example. Additionally, the network interface 840 may support communication via telecommunications/telephony networks such as analog voice networks or digital fiber communications networks, via storage area networks such as Fibre Channel SANs, or via any other suitable type of network and/or protocol.

In some embodiments, the system memory 820 may be one embodiment of a computer-accessible medium configured to store program instructions and data as described above for FIGS. 1 through 7 for implementing embodiments of a NTPD. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 800 via the I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 800 as the system memory 820 or another type of memory. Further, a computer-accessible medium may include transmission media or signals such as electrical, electromagnetic, or digital signals, conveyed via a communication medium such as a network and/or a wireless link, such as may be implemented via the network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a network traffic processing device (NTPD) implemented by one or more hardware processors and configured to implement:
a plurality of virtual network traffic processing devices (VNTPDs) configured to perform respective versions of a network processing function on one or more network transmissions, wherein at least two of the plurality of VNTPDs are configured to perform different versions of the network processing function;
a control plane configured to:
select, based on a management policy corresponding to the plurality of VNTPDs, one or more of the VNTPDs to perform one or more respective versions of the network processing function on a network transmission received at the NTPD; and
forward the network transmission to the selected one or more VNTPDs; and
an NTPD manager configured to:
monitor results of the plurality of VNTPDs performing the respective versions of the network processing function; and
based on the monitored results of the plurality of VNTPDs:
determine a configuration change for one or more of the plurality of VNTPDs; or
control output of a network transmission processed by one or more of the plurality of VNTPDs.

2. The system of claim 1, wherein the network processing function is at least one of: a firewall function, an intrusion prevention function, an intrusion detection function, a load balancing function, an application delivery controller function, a routing function, a virtual private networking function, a packet encryption function, or a packet encapsulation function.

3. The system of claim 1, further comprising a provider network comprising the NTPD, and wherein the provider network is configured to:
receive the network transmission from a remote client; and
forward the network transmission to the NTPD.

4. The system of claim 3, wherein the provider network further comprises one or more other computing devices and is further configured to forward the network transmission processed and output by the NTPD to a particular computing device of the one or more other computing devices.

5. A method, comprising:
performing, by a network traffic processing device (NTPD) implemented by one or more computing devices:
receiving a network transmission;
selecting, based on a management policy, one or more of a plurality of virtual network traffic processing devices (VNTPDs) to perform a network processing function on the network transmission, wherein the VNTPDs are implemented by the NTPD, and wherein at least two of the plurality of VNTPDs are configured to perform different versions of the network processing function;
forwarding the network transmission to the selected one or more VNTPDs;
monitoring results of the selected VNTPDs performing respective versions of the network processing function on the network transmission; and
based on the monitored results of the plurality of VNTPDs:
determining a configuration change for at least one of the plurality of VNTPDs; or
controlling output of the network transmission.

6. The method of claim 5, further comprising receiving, by the NTPD via an administrative interface, the management policy, wherein the management policy specifies one or more rules for distributing network transmissions between the plurality of VNTPDs.

7. The method of claim 6, wherein the management policy indicates that network transmissions should be provided to the VNTPDs in a round robin manner.

8. The method of claim 6, wherein the management policy indicates that a particular VNTPD of the plurality of VNTPDs should receive a particular percentage of network transmissions.

9. The method of claim 6, wherein the management policy indicates that network transmissions having a particular format should be provided to a particular VNTPD of the plurality of VNTPDs.

10. The method of claim 6, wherein the management policy indicates that network transmissions that indicate a particular source port, a particular destination port, or both should be provided to a particular VNTPD of the plurality of VNTPDs.

11. The method of claim 6, wherein the management policy indicates that the NTPD should provide network transmissions to a particular VNTPD in response to identifying particular data in a header of the network transmissions or as a result of a deep packet inspection of the network transmissions.

12. The method of claim 5, wherein the configuration change is determined, and wherein the determining the configuration change is further based on an update policy of the NTPD.

13. The method of claim 12, further comprising receiving, by the NTPD via an administrative interface, the update policy, wherein the update policy indicates one or more rules for making at least one configuration change at one or more of the plurality of VNTPDs, and wherein the at least one configuration change modifies the respective version of the network processing function performed by the determined at least one of the VNTPDs.

14. The method of claim 13, wherein the at least one configuration change modifies the respective version of the network processing function performed by the one or more respective VNTPDs to be the same as a different network processing function performed by one or more other VNTPDs of the plurality of VNTPDs.

15. A non-transitory, computer-readable storage medium storing program instructions that, when executed on one or more processors of a network traffic processing device (NTPD), cause the one or more processors to:
- implement a plurality of virtual network traffic processing devices (VNTPDs), wherein at least two of the plurality of VNTPDs are configured to perform different versions of a network processing function;
- receive a network transmission;
- select, based on a management policy, one or more of the plurality of VNTPDs to perform respective versions of the network processing function on the network transmission;
- forward the network transmission to the selected one or more VNTPDs;
- monitor results of the selected one or more VNTPDs performing respective versions of the network processing function on the network transmission; and
- based on the monitored results of the one or more VNTPDs:
    - determine a configuration change for at least one of the plurality of VNTPDs; or
    - control output of the network transmission.

16. The non-transitory, computer-readable storage medium of claim 15, wherein, to implement the plurality of VNTPDs, the instructions, when executed by the one or more processors, cause the one or more processors to implement a plurality of virtual machines, wherein each of the plurality of virtual machines is configured to execute a different respective VNTPD process that implements a different respective VNTPD.

17. The non-transitory, computer-readable storage medium of claim 15, wherein, to control the output of the network transmission, the instructions, when executed by the one or more processors, further cause the one or more processors to compare the monitored results to a traffic policy of the NTPD.

18. The non-transitory, computer-readable storage medium of claim 17, wherein the instructions, when executed by the one or more processors, further cause the one or more processors to receive, via an administrative interface, the traffic policy, wherein the traffic policy specifies one or more rules for selecting results of one of the plurality of VNTPDs to output.

19. The non-transitory, computer-readable storage medium of claim 18, wherein the network processing function is a firewall function or an intrusion prevention function, and wherein the traffic policy indicates forwarding the network transmission to a device addressed by the network transmission in response to at least one of the selected VNTPDs indicating that the network transmission should be forwarded to the device.

20. The non-transitory, computer-readable storage medium of claim 18, wherein the network processing function is a firewall function or an intrusion prevention function, and wherein the traffic policy indicates forwarding the network transmission to a device addressed by the network transmission in response to all of the selected VNTPDs indicating that the network transmission should be forwarded to the device.

* * * * *